(12) United States Patent
Casaccia

(10) Patent No.: US 7,158,625 B2
(45) Date of Patent: Jan. 2, 2007

(54) METHOD AND APPARATUS FOR AUTOMATICALLY TERMINATING A CALL

(75) Inventor: Lorenzo Casaccia, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 34 days.

(21) Appl. No.: 10/174,222

(22) Filed: Jun. 17, 2002

(65) Prior Publication Data

US 2003/0231753 A1 Dec. 18, 2003

(51) Int. Cl.
*H04M 3/42* (2006.01)
(52) U.S. Cl. .............................. 379/207.02; 379/210.01
(58) Field of Classification Search ........... 379/210.02, 379/207.02, 210.01
See application file for complete search history.

(56) References Cited

U.S. PATENT DOCUMENTS

| 5,001,709 A | | 3/1991 | Satoh |
| 5,742,674 A | * | 4/1998 | Jain et al. .............. 379/210.01 |
| 6,373,930 B1 | * | 4/2002 | McConnell et al. ... 379/114.28 |
| 6,453,034 B1 | * | 9/2002 | Donovan et al. ...... 379/220.01 |

FOREIGN PATENT DOCUMENTS

| EP | 10243122 | 9/1998 |
| GB | 2 367 707 A | 4/2002 |

* cited by examiner

*Primary Examiner*—Benny Quoc Tieu
(74) *Attorney, Agent, or Firm*—Philip Wadsworth; Thien Nguyen; Rupit Patel

(57) ABSTRACT

Systems and techniques for automatically terminating a call in a communications system involve a first subscriber unit originating a call to a second subscriber unit and terminating the call when the second subscriber unit rings.

21 Claims, 10 Drawing Sheets

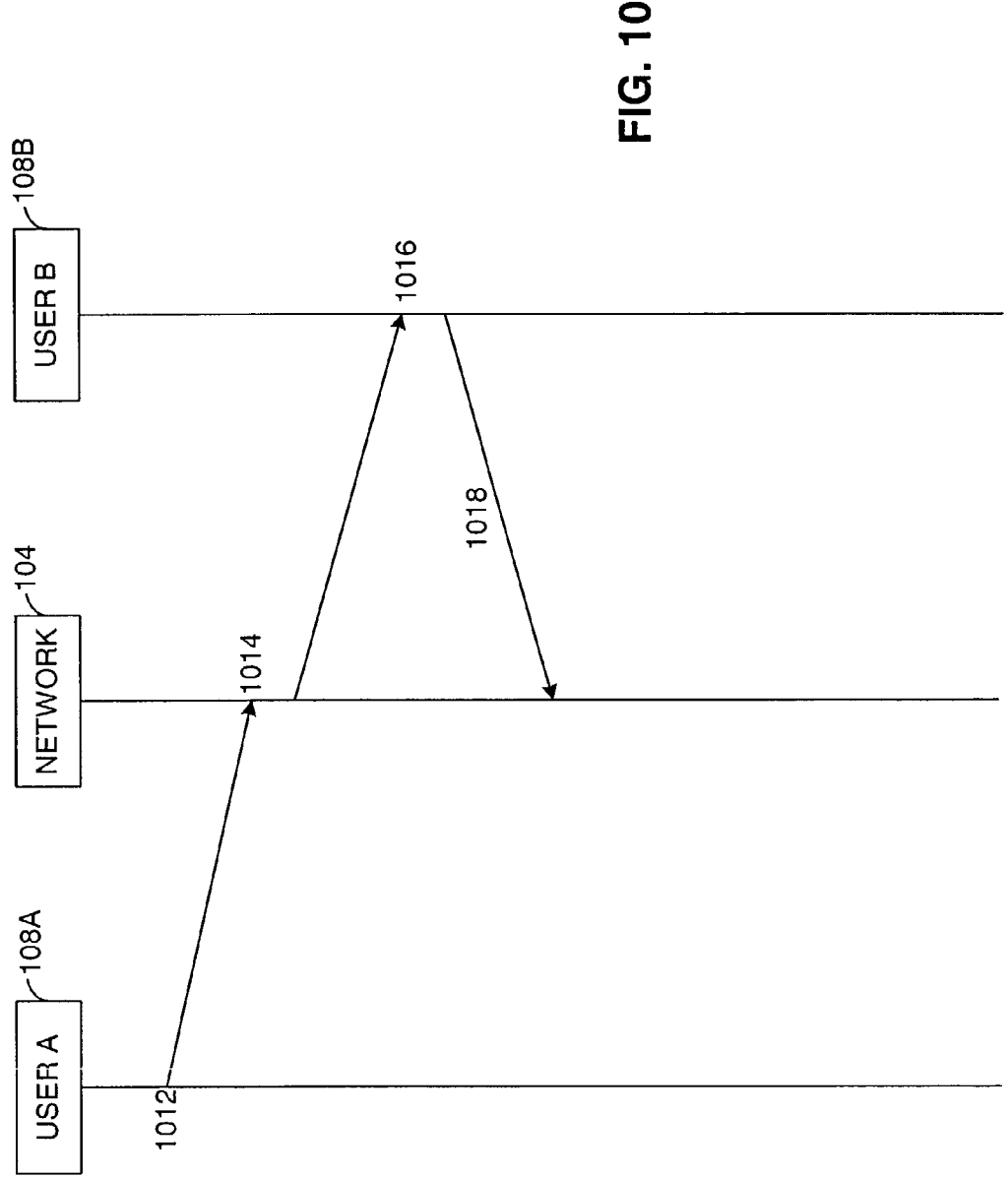

METHOD AND APPARATUS FOR AUTOMATICALLY TERMINATING A CALL

BACKGROUND

1. Field

The disclosed embodiments relate generally to the field of communications, and more specifically to methods and apparatus for automatically terminating a call in a communication system.

2. Background

The field of communications has many applications including, e.g., paging, wireless local loops, Internet telephony, and satellite communication systems. An exemplary application is a cellular telephone system for mobile subscribers. (As used herein, the term "cellular" system encompasses both cellular and personal communications services (PCS) system frequencies.) Modern communication systems designed to allow multiple users to access a common communications medium have been developed for such cellular systems. These modern communication systems may be based on code division multiple access (CDMA), time division multiple access (TDMA), frequency division multiple access (FDMA), space division multiple access (SDMA), polarization division multiple access (PDMA), or other modulation techniques known in the art. These modulation techniques demodulate signals received from multiple users of a communication system, thereby enabling an increase in the capacity of the communication system. In connection therewith, various wireless systems have been established including, e.g., Advanced Mobile Phone Service (AMPS), Global System for Mobile communication (GSM), and some other wireless systems.

In FDMA systems, the total frequency spectrum is divided into a number of smaller sub-bands and each user is given its own sub-band to access the communication medium. Alternatively, in TDMA systems, each user is given the entire frequency spectrum during periodically recurring time slots. A CDMA system provides potential advantages over other types of systems, including increased system capacity. In CDMA systems, each user is given the entire frequency spectrum for all of the time, but distinguishes its transmission through the use of a unique code.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) some other standards.

In the above named CDMA communication systems and standards, the available spectrum is shared simultaneously among a number of users, and techniques such as soft handoff are employed to maintain sufficient quality to support delay-sensitive services, such as voice. Data services are also available. More recently, systems have been proposed that enhance the capacity for data services by using higher order modulation, very fast feedback of Carrier to Interference ratio (C/I) from a mobile station, very fast scheduling, and scheduling for services that have more relaxed delay requirements. An example of such a data-only communication system using these techniques, is the high data rate (HDR) system that conforms to the TIA/EIA/IS-856 standard (the IS-856 standard).

In contrast to the other above named standards, an IS-856 system uses the entire spectrum available in each cell to transmit data to a single user at one time. One factor used in determining which user is served is link quality. By using link quality as a factor for selecting which user is served, the system spends a greater percentage of time sending data at higher rates when the channel is good, and thereby avoids committing resources to support transmission at inefficient rates. The net effect is higher data capacity, higher peak data rates, and higher average throughput.

Systems can incorporate support for delay-sensitive data, such as voice channels or data channels supported in the IS-2000 standard, along with support for packet data services such as those described in the IS-856 standard. One such system is described in a proposal submitted by LG Electronics, LSI Logic, Lucent Technologies, Nortel Networks, QUALCOMM Incorporated, and Samsung to the 3rd Generation Partnership Project 2 (3GPP2). The proposal is detailed in documents entitled "Updated Joint Physical Layer Proposal for 1xEV-DV", submitted to 3GPP2 as document number C50-20010611-009, Jun. 11, 2001; "Results of L3NQS Simulation Study", submitted to 3GPP2 as document number C50-20010820-011, Aug. 20, 2001; and "System Simulation Results for the L3NQS Framework Proposal for cdma20001x-EVDV", submitted to 3GPP2 as document number C50-20010820-012, Aug. 20, 2001. These are hereinafter referred to as the 1xEV-DV proposal.

All of the aforementioned standards do not include a feature that enables automated termination of a call attempt. A call is a connection between two endpoints in a communications system. At one endpoint, a first user (also called a calling party) on a first subscriber station initiates a call. At another endpoint, a second user (also called a called party) on a second subscriber station receives an indication of the incoming call. In addition, the second user may also receive an indication of the identity of the first user, which the second user is able to determine if the second subscriber station has a caller-ID feature (or equivalent feature).

Typically, the second user will hear a ring on the second subscriber station indicating an incoming call. A first user may want to merely ring the second user and not talk with the second user. In this case, the first user tries to manually terminate the call by for example "hanging up" on the second user before the second user answers the call. However, the second user may answer the call before the first user manually terminates the call, which frustrates the first user's purpose for initiating the call. Thus, there is a need in the art for a feature that enables automated termination of a call, which would enable users to ring other users without risking that the call would be answered.

SUMMARY

Embodiments disclosed herein address the need for a feature that enables automated termination of a call. The disclosed embodiments provide methods and system elements that implement various aspects of the invention, as described in further detail below.

Embodiments disclosed herein address the above stated needs by providing a method and apparatus for automatically terminating a call. In one aspect, a method of communications comprises originating a call and indicating termination of the call, and terminating automatically the call responsive to the indicated termination of the call.

In another aspect, a method of communications comprises sending a call message that initiates a call; sending a call notification message responsive to the call message, the call notification message providing notification of the call, sending a confirmation message responsive to the call notification message, the confirmation message confirming receipt of the call notification message, sending a ringing message responsive to the confirmation message, the ringing message indicating ringing, sending automatically a termination message responsive to the confirmation message, and sending a corresponding termination message responsive to the termination message.

In another aspect, a method of communications comprises receiving a message that initiates a call with an indication to terminate the call and terminating the call responsive to receiving the message that initiates the call with an indication to terminate the call.

In another aspect, a method of communications comprises receiving a call message that initiates a call, receiving an indication that the call is a ring-only call, sending a call notification message responsive to the call message, the call notification message providing notification of the call, and sending a termination message responsive to the indication that the call is a ring-only call, the termination message terminating the call.

In another aspect, a subscriber station comprises a call origination unit configured to originate a call and indicate termination of the call, and a terminating unit configured to terminate the call automatically.

In another aspect, a subscriber station comprises means for originating a call, means for indicating termination of the call, and means for terminating the call automatically.

In another aspect, a subscriber station comprises a receive unit that receives a message that initiates a call with an indication to terminate the call, and a terminating unit that terminates the call responsive to receiving the message that initiates the call with an indication to terminate the call.

In another aspect, a subscriber station comprises means for receiving a message that initiates a call with an indication to terminate the call, and means for terminating the call responsive to receiving the message that initiates the call with an indication to terminate the call.

In another aspect, a network comprises a receive unit configured to receive a call message that initiates a call and receive an indication that the call is a ring-only call, and a send unit configured to send a call notification message responsive to the call message, the call notification message providing notification of the call, and configured to send a termination message responsive to the indication that the call is a ring-only call, the termination message terminating the call.

In another aspect, a communications system comprises a first subscriber station configured to create and send a message that initiates a call and configured to create and send automatically a termination message responsive to a message indicating ringing, the termination message terminating the call; and a second subscriber station configured to ring upon receiving the message that initiates a call and configured to send a message indicating ringing.

BRIEF DESCRIPTION OF THE DRAWINGS

FIG. 10 shows a flow diagram of an exemplary embodiment of a communications system, wherein an indication of automatic call termination is indicated in a message and a second subscriber station terminates a call.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention.

In an exemplary embodiment of a communications system, a communications device can access a network, or communicate with other devices. The network can be a packet-based network, such as the Internet or a corporate Intranet, public switched telephone network (PSTN), or any other suitable network. An access network can be used to provide a wireless interface between the communications device and the network. An access network may take on various forms including, by way of example, one or more base stations in communication with a base station controller. The exemplary communications system can support various communications devices, including mobile or stationary subscriber stations.

A subscriber station can also be called a subscriber unit, mobile station, mobile, remote station, remote terminal, access terminal, user terminal, user agent, or user equipment. A subscriber station may be a cellular telephone, cordless telephone, a computer or other processing device connected to a wireless modem, a wireless local loop (WLL) station, or a personal digital assistant (PDA) or handheld device having wireless connection capability. A subscriber station may also be a Session Initiation Protocol (SIP) phone, cell phone, or computer.

Although various aspects of the present invention will be described in the context of a CDMA communications system, those skilled in the art will appreciate that the techniques for automatically terminating a call described herein are likewise suitable for use in various other communications environments including communications systems based on TDMA, FDMA, SDMA, PDMA, and other modulation techniques known in the art, and communications systems based on standards including AMPS, GSM, HDR, and various CDMA standards, and other communication standards known in the art. Accordingly, any reference to a CDMA communications system is intended only to illustrate the inventive aspects of the present invention, with the understanding that such inventive aspects have a wide range of applications.

Figure 1:
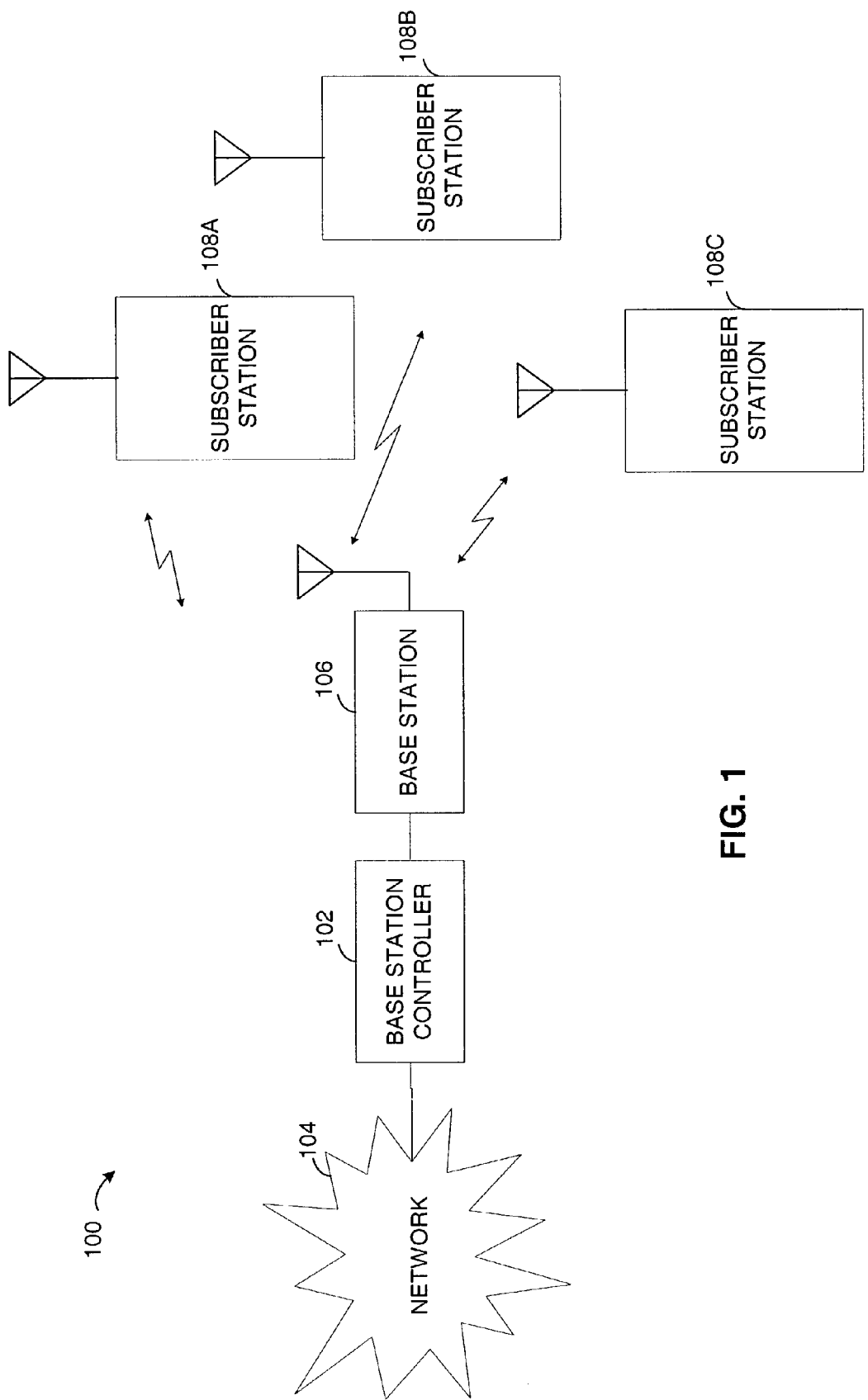
FIG. 1 is a simplified block diagram of an exemplary communications system.

FIG. 1 is a simplified block diagram of an exemplary communications system 100 capable of operating in accordance with any of the CDMA communication system standards while incorporating various embodiments of the invention. The exemplary communications system is a modulation and multiple access scheme based on spread-spectrum communications.

Communications system 100 may be for communications of voice, data or both. A base station controller 102 can be used to provide an interface between a network 104 and all base stations dispersed throughout a geographic region. For ease of explanation, only one base station 106 is shown. The geographic region is generally subdivided into smaller regions known as cells. Each base station is configured to serve all subscriber stations in its respective cell. In some high traffic applications, the cell may be divided into sectors with a base station serving each sector. Three subscriber stations 108a–c are shown in communication with the base station 106. Each subscriber station 108a–c may access the network, or communicate with other subscriber stations, through one or more base stations under the control of the base station controller 102. In at least one embodiment, the communications system 100 supports high rate data and high quality voice services over wireless communications channels.

The exemplary communications system 100 supports two-way communications between the base station 106 and the subscriber stations 108a–c. Transmissions from the base station to a subscriber station are referred to as a forward link, and transmissions from a subscriber station to the base station is referred to as a reverse link.

The communications between the base stations and the subscriber stations in communications system 100 may include communications of voice and data. Such a communication link also includes communications of control messages for establishing, maintaining and terminating the flow of data between the base stations and the subscriber stations. The control information may be in a form of a stream of messages that are communicated between the source and destination. The control information, therefore, may be processed through a signaling protocol layer.

Subscriber stations may be used to perform functions in addition to performing voice calls or data calls. A very popular use of subscriber stations is, for example, short message service (SMS) messaging. SMS messaging enables short character messages to be transmitted between subscriber stations and external systems such as electronic mail, paging, and voice-mail systems.

Another use of subscriber stations that is rapidly becoming more widespread in Europe is the use of subscriber stations in a fashion that is similar to pagers. In this context, subscriber station users are using their subscriber stations "to ring" other subscriber stations. A first user of a first subscriber station initiates a call to a second user of a second subscriber station and the first user "hangs up," i.e., terminates the call, when the first user hears a ring tone (also called a dial tone) indicating that the second subscriber station is ringing. Thus, the first user "rings" the second user.

When the first subscriber station calls the second subscriber station, the first subscriber station sends a call message to the second subscriber station. The call message indicates an incoming call to the second subscriber station. If the second subscriber station has a caller-ID feature (or equivalent feature), a common feature on cellular phones, the second subscriber station captures the identity of the caller. Once captured, the second subscriber station indicates the caller identity to the second user.

In the case where the captured identity of the caller is displayed, the second user could see, for example, a message like "Missed Call from First User." Such a displayed message may have different meanings depending on social context. For example, such a displayed message may mean that the first user is requesting a call back from the second user, which is analogous to the first user paging the second user, or the displayed message may be an indication to the second user to take some action.

A first user performs the operation of terminating a call upon hearing a ring tone when the first user only wants to ring the second user and does not want to talk with the second user. A first user terminates a call by indicating such on a user interface of the first subscriber station. In cellular communications, the ring tone is not broadcast over the air. The ring tone in the first subscriber station is generated by the first subscriber station as soon as the network communicates to the first subscriber station that there is a connection with the second subscriber station and the second subscriber station is ringing.

Figure 2:
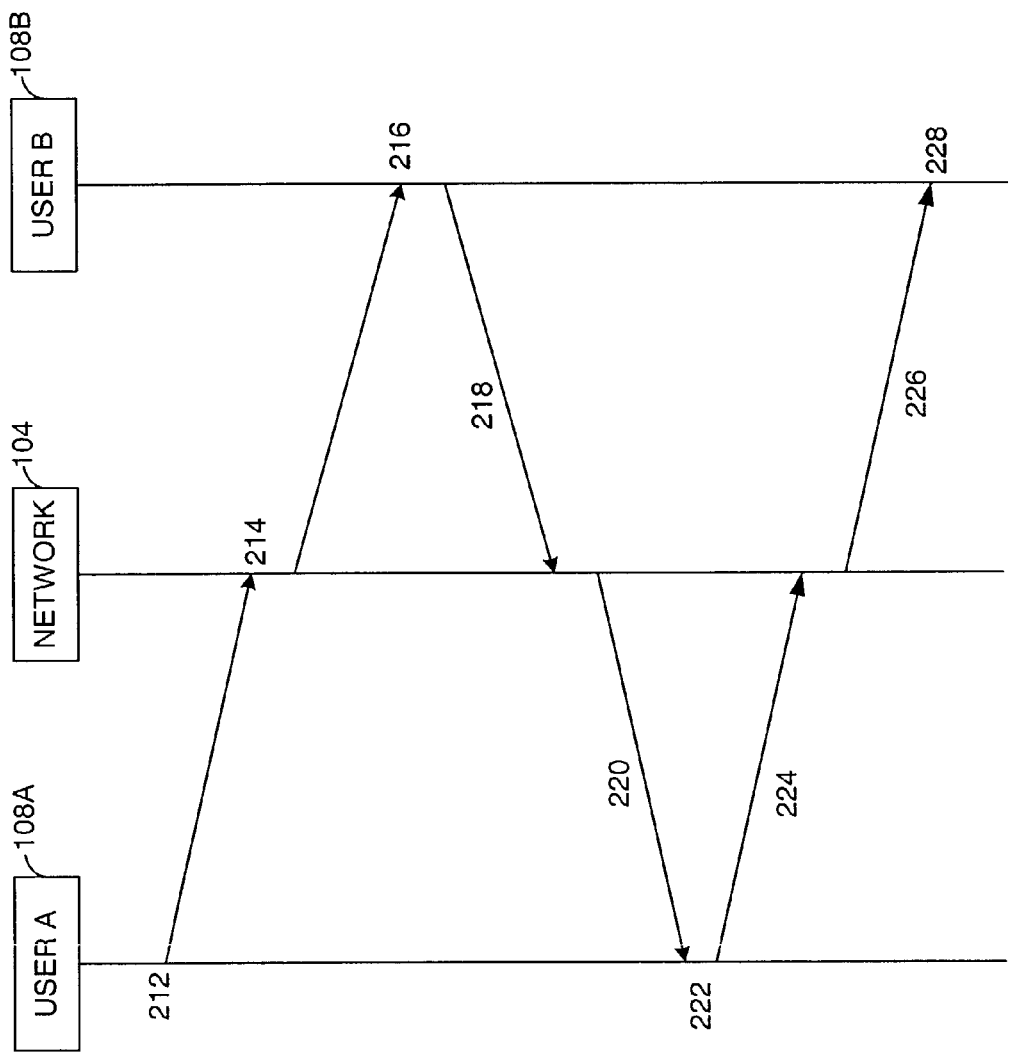
FIG. 2 illustrates a message flow diagram for manual termination of a call when a user merely wants to ring a second user and does not want to talk to the second user.

FIG. 2 illustrates a message flow diagram for manual termination of a call when a user merely wants to ring a second user and does not want to talk to the second user.

In step 212, the first user 108a dials the number of the second user 108b and originates a call. A call can be initiated by depressing a call button or in the case of a voice enabled subscriber station, a call can be initiated by a voice command. A call message (also called a request for call origination) is created and sent to a network 104.

In step 214, the network 104 receives the call message. The network 104 finds the second user in a register of users and sends a page to the second user. That is, the network 104 sends a call notification message to the second subscriber station. The call notification message indicates that there is an incoming voice call for the second user.

In step 216, the second subscriber station receives the incoming call notification message and begins ringing. An enabled caller ID feature or the second subscriber station enables the first user's identity to be displayed on the second subscriber station.

In step 218, the second subscriber station sends a confirmation message to the network 104. The confirmation message indicates that the second subscriber station acknowledges the second subscriber station's receipt of the incoming call.

Once the network 104 receives the confirmation message from the second subscriber station, the network 104 determines that that the first user and the second user can talk as soon as the second user answers the call. Therefore, in step 220, the network 104 sends a ringing message to the first user.

In step 222, a ringing tone is generated on the first subscriber station 108*b* upon its receipt of the ringing message and therefore the first user hears the ringing tone 108*b*. Commonly, this means, for the first user that the second user's subscriber station 108*b* is ringing.

If the first user actually wants to talk with the second user, the first user simply waits for the second user to answer the ring on the second subscriber station. If the first user only wants to ring the second user, then the first user indicates such on the second subscriber station 108*b*, i.e., the first user "hangs up." Thus, the first user manually terminates the call. The first user can manually terminate the call by depressing a button. In a voice enabled subscriber station, the first user can manually terminate the call by issuing a voice command to terminate the call.

In step 224, a termination message is generated at the first subscriber station 108*b* and sent to the network 104. Then, in step 226, the network 104 sends a corresponding termination message to the second subscriber station 108*b* after the network 104 receives the termination message from the first subscriber station 108*b*.

In step 228, the call attempt is terminated at the second subscriber station and the second subscriber station stops ringing when the termination message from the network 104 is received. A display on the second subscriber station may display a message indicating a missed call from the second subscriber station 108*b*.

In an exemplary embodiment of a communications system, the process by which a second subscriber station 108*b* terminates a call upon the ringing of a second subscriber station is automated. In at least one exemplary embodiment of the communications system, as soon as the second subscriber station 108*b* generates a ring tone, the call is terminated automatically. In contrast to having to depress a button or issue a voice command to terminate the call, the first user does not need to press or do anything after hearing a ring tone in order to terminate the call.

The first user indicates automatic termination of a call on a user interface of the first subscriber station as part of a call origination process. In an embodiment, automatic call termination is indicated by depression of a button in conjunction with dialing of the second user. In another embodiment, automatic call termination is indicated by issuance of a voice command in conjunction with dialing of the second user. In yet another embodiment, automatic call termination is indicated by a combination of depression of a button and issuance of a voice command in conjunction with dialing of the second user. Thus, the caller as part of the call origination process initiates the automatic termination of the call.

Figure 3:
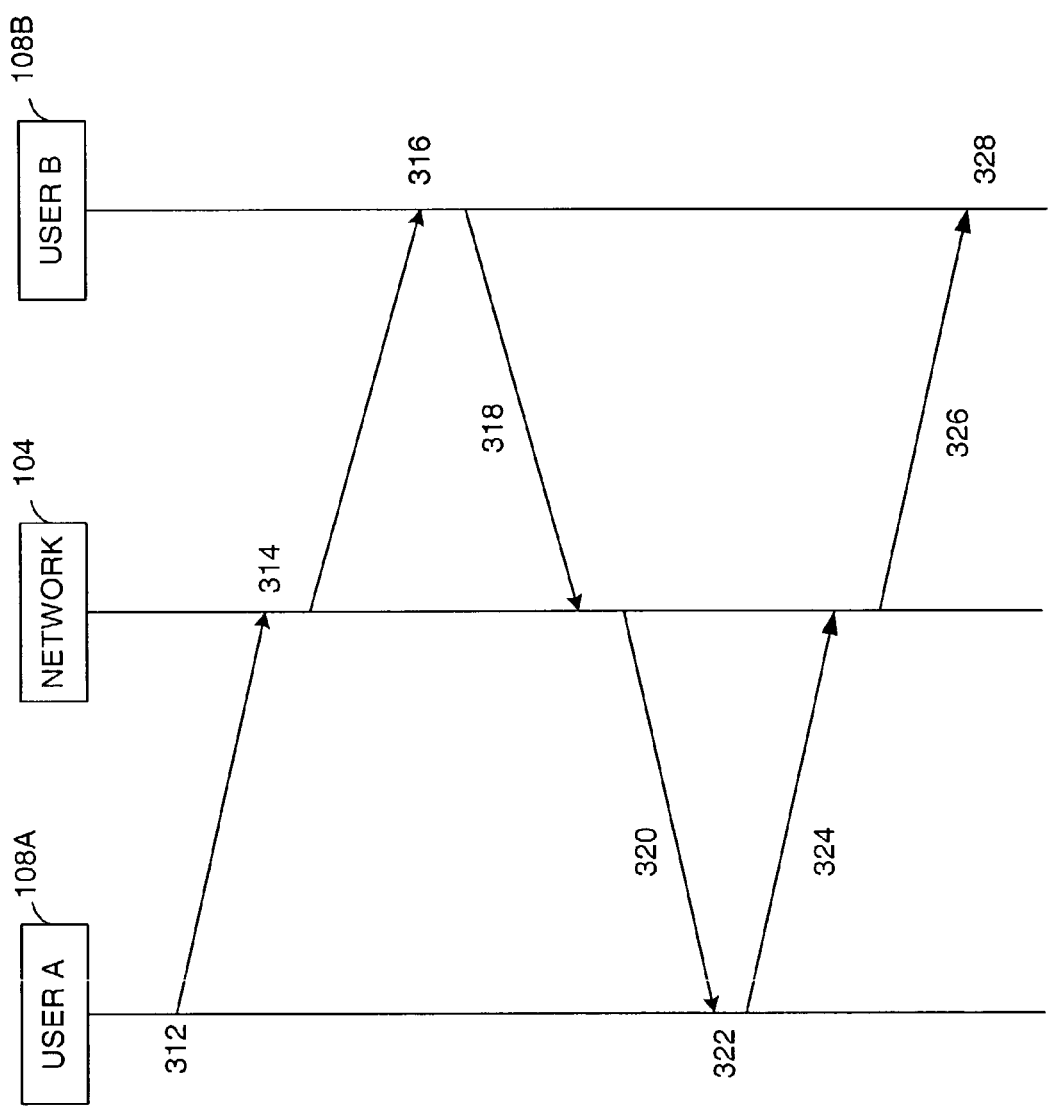
FIG. 3 shows a flow diagram of an exemplary embodiment of a communications system, wherein the first user only wants to ring the second user and a call is terminated automatically.

FIG. 3 shows a flow diagram of an exemplary embodiment of a communications system, wherein the first user only wants to ring the second user and a call is terminated automatically. In this embodiment, no changes to the air interface or to signaling messages are required in order to implement automatic termination of a call. Therefore, the FIG. 3 flow diagram looks like the FIG. 2 flow diagram, but the steps are different.

In step 312, the first user 108*a* originates a call that will ring the second user and will automatically be terminated upon the ringing of the second subscriber station 108*b*. The call is originated by the first user 108*a* dialing the number of the second user 108*b*. The first user 108 indicates on the user interface of the first subscriber station 108*a* that the call will automatically be terminated upon the ringing of the second subscriber station 108*b*. Thus, a call message is created and sent to a network 104, but the first subscriber station 108*a* has already identified the ongoing attempted call as a call that will automatically be terminated upon the ringing of the second subscriber station 108*b*. The identification of the ongoing attempted call as a call that will automatically be terminated occurs on the first subscriber station and is not indicated in the call message sent to the network 104.

In step 314, the network 104 receives the request for call origination, i.e., the call message. The network 104 includes a receive unit configured to receive the call message that initiates the call and configured to receive an indication that the call is a ring-only call. The network also includes a send unit configured to send a call notification message responsive to the call message, the call notification message providing notification of the call, and configured to send a termination message responsive to the indication that the call is a ring-only call, the termination message terminating the call.

The network 104 finds the second user in a register of users and sends a call notification message to the second user. The call notification message indicates to the second user that there is an incoming voice call for the second user.

In step 316, the second subscriber station 108*b* receives the incoming call notification message and begins ringing. An enabled caller ID feature on the second subscriber station 108*b* enables the first user's identity to be displayed on the second subscriber station 108*b*. In an embodiment, the captured identity of the caller is displayed on a display of the second subscriber station. Alternatively, the captured identity of the caller is announced by a speaker on the second subscriber station.

In step 318, the second subscriber station 108*b* sends a confirmation message to the network 104. The confirmation message indicates that the second subscriber station 108*b* acknowledges the second subscriber station's 108*b* receipt of the incoming call notification.

Once the network 104 receives the confirmation message from the second subscriber station 108*b*, the network 104 determines that that the first user and the second user can talk as soon as the second user answers the call. Therefore, in step 320, the network 104 sends a ringing message to the first user.

In an embodiment, a ringing tone is generated on the first subscriber station 108*a* upon the first subscriber station's receipt of the ringing message and therefore the first user hears the ringing tone in step 322. Commonly, this means for the first user that the second user's subscriber station is ringing. In another embodiment, a ringing tone is not generated on the first subscriber station 108*a* upon the first subscriber station's 108*a* receipt of the ringing message in step 322.

In step 324, a termination message is generated at the first subscriber station 108*a* and sent to the network 104 without requiring any action by the first user 108*a*. Then, in step 326, the network 104 sends a corresponding termination message to the second subscriber station 108*b* after the network 104 receives the termination message from the first subscriber station 108*a*. Thus, the messages of steps 324 and 326 are triggered automatically. Upon receipt of the ringing message from the network 104, the termination messages of steps 324 and 326 are triggered without the aid of the first user.

In step 328, the call attempt is terminated at the second subscriber station 108*b* and the second subscriber station 108*b* stops ringing when the termination message from the network 104 is received. In an embodiment, a display on the second subscriber station 108*b* displays a message indicating a missed call from the first subscriber station 108*a*. In another embodiment, a message indicating a missed call from the first subscriber station 108*a* is announced by a speaker on the second subscriber station.

Figure 4:
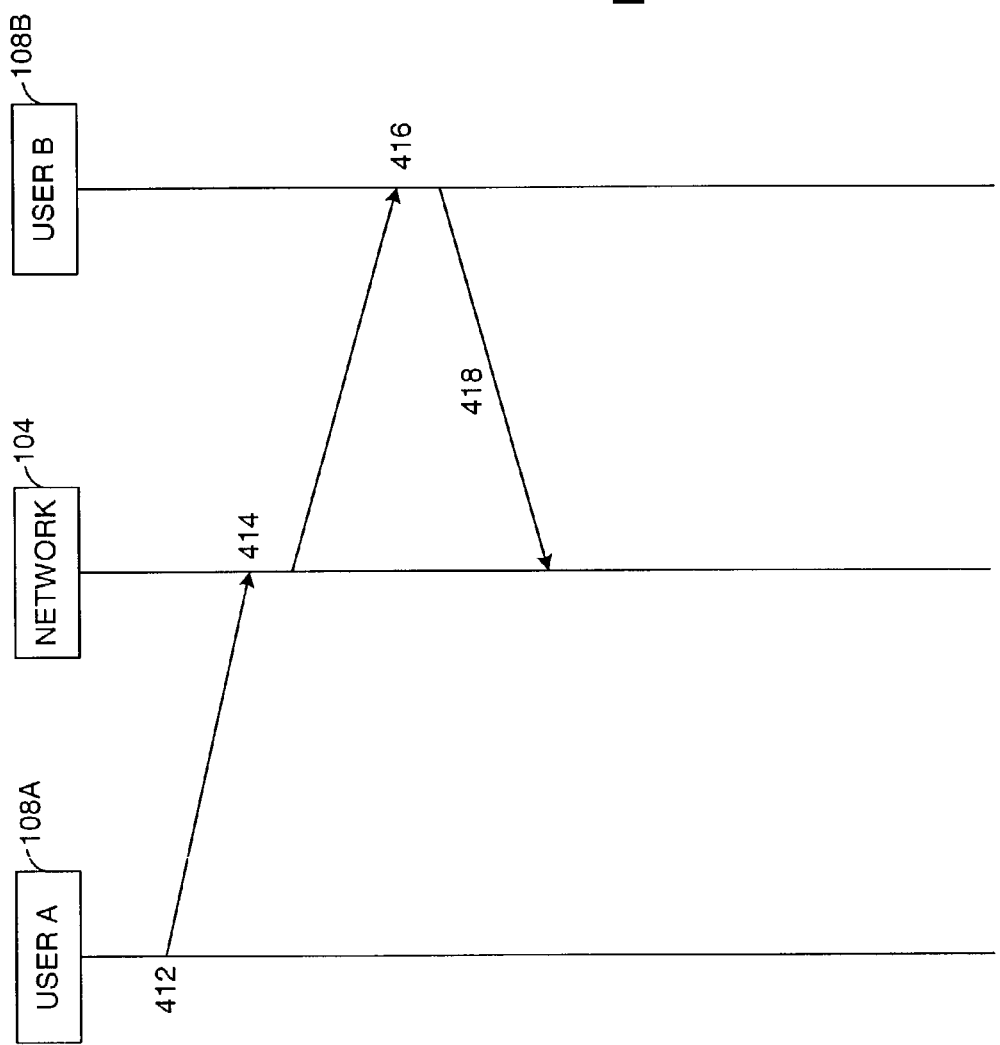
FIG. 4 shows a flow diagram of an exemplary embodiment of a communications system, wherein an indication of automatic call termination is indicated in a message.

FIG. 4 shows a flow diagram of an exemplary embodiment of a communications system, wherein the first user only wants to ring the second user and a call is terminated automatically. In this embodiment, signaling messages are changed in order to implement automatic termination of a call. In step 412, when the first user determines that he only wants to ring the second user, a flag is set indicating that the first user is only ringing the second user. The flag can be encoded within the call message.

In at least one exemplary embodiment of the communications system, the first user indicates via a user interface on the first subscriber station 108*a* that a ring of the second user and not a call of the second user is to be performed. That is, the second user is to be rung and not called.

In at least one exemplary embodiment of the communications system, the first user indicates that the second user will be rung with a mechanism activated while dialing the number of the second user. In another exemplary embodiment of the communications system, the first user indicates that the second user will be rung with a mechanism separate from dialing the number of the second user. The mechanism distinguishes between the case wherein the first user wants to talk to the second user and the case wherein the first user wants only to ring the second user. In at least one exemplary embodiment of the communications system, the mechanism is at least one button to be depressed. In another exemplary embodiment, the mechanism is at least one key to be depressed. In another exemplary embodiment, the mechanism is at least one voice command to be issued in a voice enabled subscriber station. In at least one exemplary embodiment, the mechanism is implemented via a Web interface on the first subscriber station 108*a*. If the mechanism is enabled, a pending call will automatically be terminated.

In step 414, the network 104 receives the call message. In an embodiment, the network 104 receives an indication that the user only wants to ring the second user in the call message. In another embodiment, the network 104 receives an indication that the user only wants to ring the second user in a message other than the call message. At this point, the network 104 can determine from the indication (hereinafter called a ring-only indication) that there is no need to send a ringing message to the first subscriber station 108*a*. The network 104 finds the second user in a register of users and sends a ring-only indication to the second user. That is, the network 104 sends a notification to the second user that the second user is to be rung only.

In step 416, the second subscriber station 108*b* receives the incoming ring-only indication and begins ringing. An enabled caller ID feature on the second subscriber station 108*b* enables the first user's identity to be displayed on the second subscriber station 108*b*. In an embodiment, the captured identity of the caller is displayed on a display of the second subscriber station. In another embodiment, the captured identity of the caller is announced by a speaker on the second subscriber station.

In step 418, the second subscriber station 108*b* sends a confirmation message to the network 104. The confirmation message indicates that the second subscriber station 108*b* acknowledges the second subscriber station's 108*b* receipt of the incoming ring-only indication.

In an embodiment, the network is not required to send a ringing message to the first subscriber station 108*a*, thereby saving bandwidth in a communication channel from the network 104 to the first subscriber station 108*a*. Alternatively, the network may send a ringing message to the first subscriber station 108*a*.

Figure 5:
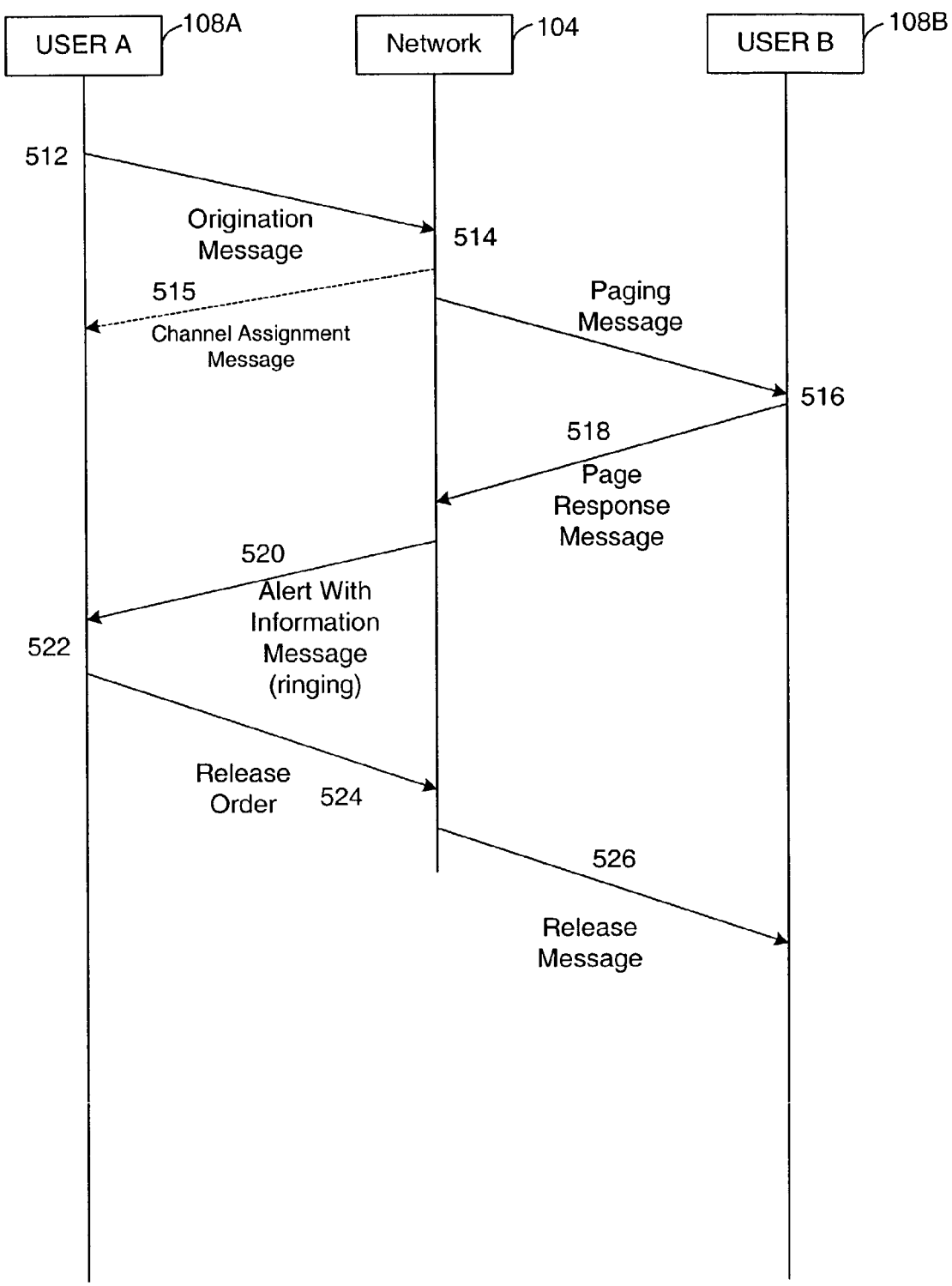
FIG. 5 shows a flow diagram of an exemplary embodiment of a CDMA communications system, wherein the first user only wants to ring the second user and a call is terminated automatically.

FIG. 5 shows a flow diagram of an exemplary embodiment of a CDMA communications system, wherein the first user only wants to ring the second user and a call is terminated automatically. In this embodiment, no changes to the air interface or to signaling messages are required in order to implement automatic termination of a call. Therefore, the FIG. 5 flow diagram looks like the FIG. 2 flow diagram, but the steps are different.

In step 512, the first user 108*a* originates a call that will ring the second user and will automatically be terminated upon the ringing of the second subscriber station 108*b*. The call is originated by the first user 108*a* dialing the number of the second user 108*b*. The first user 108 indicates on the user interface of the first subscriber station 108*a* that the call will automatically be terminated upon the ringing of the second subscriber station 108*b*. Thus, a call message (also called an Origination Message) is created and sent to a network 104, but the first subscriber station 108*a* has already identified the ongoing attempted call as a call that will automatically be terminated upon the ringing of the second subscriber station 108*b*. The identification of the ongoing attempted call as a call that will automatically be terminated occurs on the first subscriber station and is not indicated in the call message sent to the network 104.

In step 514, the network 104 receives the request for call origination, i.e., the call message. The network 104 finds the second user in a register of users and sends a page to the second user. That is, the network 104 sends a call notification message (also called a Paging Message) to the second user that there is an incoming voice call for the second user. Thus, the network 104 allocates a first communication channel with its attendant resources to the first subscriber station 108*a* and allocates a second communication channel with its attendant resources to the second subscriber station 108*b*.

In step 515, a Channel Assignment Message is sent from the network 104 to the first subscriber station 108*a*. The Channel Assignment Message assigns the first communication channel to the first subscriber station 108*a*. In an embodiment, the Channel Assignment Message is sent from the network 104 to the first subscriber station 108*a* before a ringing message is sent from the network 104 to the first subscriber station 108*a*. Alternatively, the Channel Assignment Message is sent from the network 104 to the first subscriber station 108*a* after a ringing message is sent from the network 104 to the first subscriber station 108*a*. Whether the Channel Assignment Message is sent from the network 104 to the first subscriber station 108*a* before or after a ringing message is sent from the network 104 to the first subscriber station 108*a* is implementation dependent.

In step 516, the second subscriber station 108*b* receives the incoming call notification message and begins ringing. An enabled caller ID feature on the second subscriber station 108*b* enables the first user's identity to be displayed on the second subscriber station 108*b*. In an embodiment, the captured identity of the caller is displayed on a display of the second subscriber station. Alternatively, the captured identity of the caller is announced by a speaker on the second subscriber station.

In step 518, the second subscriber station 108b sends a confirmation message (also called a Page Response Message) to the network 104. The confirmation message indicates that the second subscriber station 108b acknowledges the second subscriber station's 108b receipt of the incoming call notification.

Once the network 104 receives the confirmation message from the second subscriber station 108b, the network 104 determines that that the first user and the second user can talk as soon as the second user answers the call. Therefore, in step 520, the network 104 sends a ringing message to the first user. In an embodiment, the ringing message is an Alert With Information Message that alerts the first user with information regarding the ringing of the second subscriber station 108b.

In an embodiment the Channel Assignment Message is sent by the network 104 to the first subscriber station 108a before the network 104 sends the ringing message to the first subscriber station 108a. Alternatively, the Channel Assignment Message is sent by the network 104 after the network 104 sends the ringing message to the first subscriber station 108a. In an embodiment, the network 104 does not send a Channel Assignment Message to the first subscriber station 108a.

In an embodiment, a ringing tone is generated on the first subscriber station 108a upon the first subscriber station's receipt of the ringing message and therefore the first user hears the ringing tone in step 522. Commonly, this means for the first user that the second user's subscriber station is ringing. In another embodiment, a ringing tone is not generated on the first subscriber station 108a upon the first subscriber station's 108a receipt of the ringing message in step 522.

In step 524, a termination message (also called a Release Order) is generated at the first subscriber station 108a and sent to the network 104 without requiring any action by the first user 108a. The network releases the first communication channel with its attendant resources that was allocated to the first subscriber station 108a. Then, in step 526, the network 104 sends a corresponding termination message (also called a Release Message) to the second subscriber station 108b after the network 104 receives the termination message from the first subscriber station 108a. The network releases the second communication channel with its attendant resources that was allocated to the second subscriber station 108b. Thus, the messages of steps 524 and 526 are triggered automatically. Upon receipt of the ringing message from the network 104, the termination messages of steps 524 and 526 are triggered without the aid of the first user. The termination messages of steps 524 and 526 release resources allocated for the communication channels between the first subscriber station 108a and the second subscriber station 108b.

In step 528, the call attempt is terminated at the second subscriber station 108b and the second subscriber station 108b stops ringing when the termination message from the network 104 is received. In an embodiment, a display on the second subscriber station 108b displays a message indicating a missed call from the first subscriber station 108a. In another embodiment, a message indicating a missed call from the first subscriber station 108a is announced by a speaker on the second subscriber station.

Figure 6:
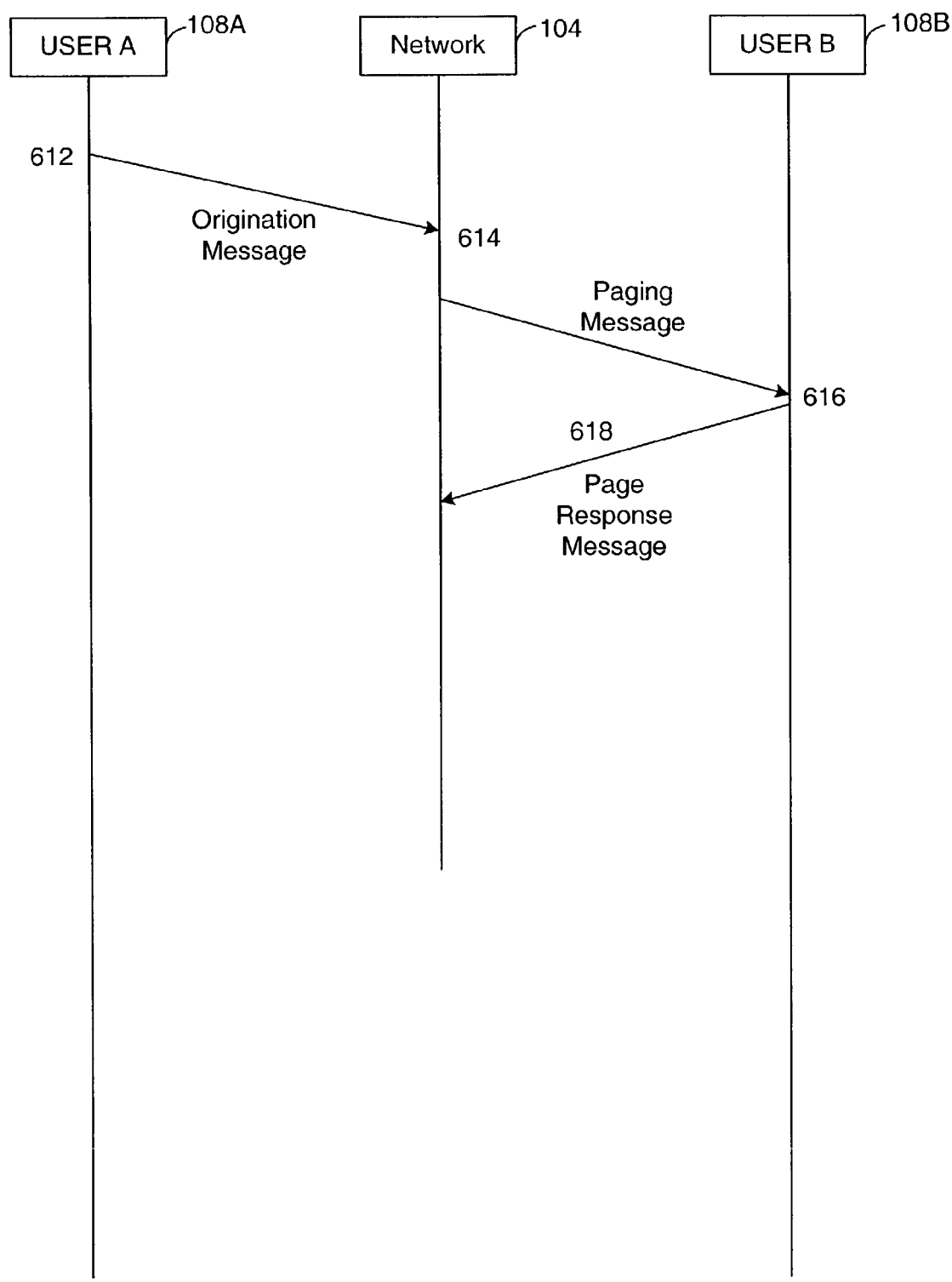
FIG. 6 shows a flow diagram of an exemplary embodiment of a CDMA communications system, wherein an indication of automatic call termination is indicated in a message.

FIG. 6 shows a flow diagram of an exemplary embodiment of a CDMA communications system, wherein the first user only wants to ring the second user and a call is terminated automatically. In this embodiment, signaling messages are changed in order to implement automatic termination of a call. In step 412, when the first user determines that he only wants to ring the second user, a flag is set indicating that the first user is only ringing the second user. The flag can be encoded within the call message.

In at least one exemplary embodiment of the communications system, the first user indicates via a user interface on the first subscriber station 108a that a ring of the second user and not a call of the second user is to be performed. That is, the second user is to be rung and not called.

In at least one exemplary embodiment of the communications system, the first user indicates that the second user will be rung with a mechanism activated while dialing the number of the second user. In another exemplary embodiment of the communications system, the first user indicates that the second user will be rung with a mechanism separate from dialing the number of the second user. The mechanism distinguishes between the case wherein the first user wants to talk to the second user and the case wherein the first user wants only to ring the second user. In at least one exemplary embodiment of the communications system, the mechanism is at least one button to be depressed. In another exemplary embodiment, the mechanism is at least one key to be depressed. In another exemplary embodiment, the mechanism is at least one voice command to be issued in a voice enabled subscriber station. In at least one exemplary embodiment, the mechanism is implemented via a Web interface on the first subscriber station 108a. If the mechanism is enabled, a pending call will automatically be terminated.

In step 614, the network 104 receives the request for call origination, i.e., the call message. In an embodiment, the network 104 receives an indication that the user only wants to ring the second user in the call message. In another embodiment, the network 104 receives an indication that the user only wants to ring the second user in a message other than the call message. At this point, the network 104 can determine from the indication (hereinafter called a ring-only indication) that there is no need to send a ringing message to the first subscriber station 108a. The network 104 finds the second user in a register of users and sends a ring-only indication to the second user. That is, the network 104 sends a call notification message (also called a Paging Message) to the second user that the second user is to be rung only. There is no need to allocate communication channels with their attendant resources since the network 104 knows that the second user is to be rung only.

In step 616, the second subscriber station 108b receives the incoming ring-only indication and begins ringing. An enabled caller ID feature on the second subscriber station 108b enables the first user's identity to be displayed on the second subscriber station 108b. In an embodiment, the captured identity of the caller is displayed on a display of the second subscriber station. In another embodiment, the captured identity of the caller is announced by a speaker on the second subscriber station.

In step 618, the second subscriber station 108b sends a confirmation message (also called a Page Response Message) to the network 104. The confirmation message indicates that the second subscriber station 108b acknowledges the second subscriber station's 108b receipt of the incoming ring-only indication.

In an embodiment, the network is not required to send a ringing message (also called an Alert with Information Message) to the first subscriber station 108a, thereby saving bandwidth in a communication channel from the network 104 to the first subscriber station 108a. Alternatively, the network may send a ringing message to the first subscriber station 108a.

Upon receipt of the confirmation message, the network 104 de-allocates the first communication channel with its attendant resources to the first subscriber station 108a and de-allocates the second communication channel with its attendant resources to the second subscriber station 108b.

Figure 7:
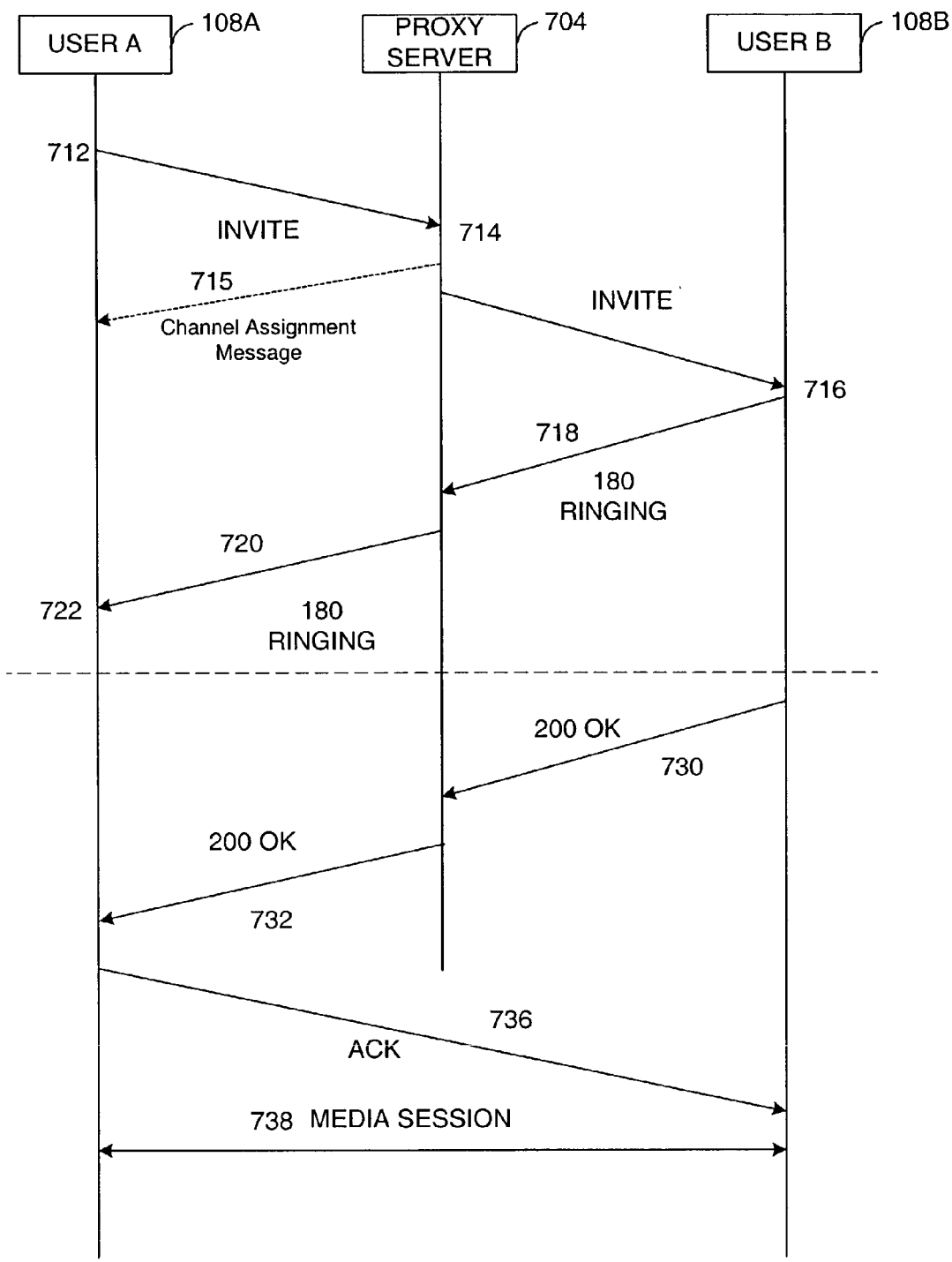
FIG. 7 shows a flow diagram of a Session Initiation Protocol (SIP) communications system, wherein a media session is created between a first user on a first subscriber station and a second user on a second subscriber station.

FIG. 7 shows a flow diagram of a Session Initiation Protocol (SIP) communications system, wherein a media session is created between a first user on a first subscriber station and a second user on a second subscriber station. In a SIP communications system, communications between two subscriber units is established through a proxy server. A proxy server acts as an intermediary to ensure security between subscriber units. The communication link between a subscriber unit can be a wire line communication link or a wireless communication link.

In step 712, the first user 108a originates a call (also called an invite) to a second user. The call includes details of the type of a media session that is requested by the first user. The types of media sessions that could be requested include, but are not limited to an audio session, a video session, and a multimedia session, for example. The call is originated by the first user 108a dialing the number of the second user 108b. Thus, a call message is created and sent to a proxy server 704. A proxy server 704 is a server that acts as an intermediary between a first subscriber station 108a and a second subscriber station 108b.

In step 714, the proxy server 704 receives the request for call origination, i.e., the call message. The proxy server 704 finds the second user in a register of users and sends a page to the second user. That is, the proxy server 704 sends a call notification message (also called an invite) to the second user that there is an incoming voice call for the second user.

In step 715, a Channel Assignment Message is sent from the proxy server 704 to the first subscriber station 108a. The Channel Assignment Message assigns the first communication channel to the first subscriber station 108a.

In step 716, the second subscriber station 108b receives the incoming call notification message and begins ringing. Thus, the proxy server 704 allocates a first communication channel with its attendant resources to the first subscriber station 108a and allocates a second communication channel with its attendant resources to the second subscriber station 108b.

In step 718, the second subscriber station 108b sends a ringing message to the proxy server 704. The ringing message indicates that the second subscriber station 108b is ringing. In step 720, once the proxy server 704 receives the ringing message from the second subscriber station 108b, the proxy server 704 sends a ringing message to the first subscriber station 108a. In step 722, a ringing tone is generated on the first subscriber station 108a upon the first subscriber station's receipt of the ringing message and therefore the first user hears the ringing tone. Commonly, this means for the first user that the second user's subscriber station is ringing.

When the second user accepts the call, in step 730, the second subscriber station 108b sends a confirmation message (also called an O.K. message) to the proxy server 704. The confirmation message indicates that the second user on the second subscriber station 108b has answered the call.

Once the proxy server 704 receives the confirmation message from the second subscriber station 108b, the proxy server 704 determines that that the first user and the second user can communicate directly. Therefore, in step 732, the proxy server 704 sends a confirmation message to the first user.

In step 736, an acknowledgment that acknowledges the receipt of the confirmation message is sent directly from the first subscriber station 108a to the second subscriber station 108b. In step 738, once the second subscriber station 108b receives the acknowledgment, a media session is created between the first subscriber station 108a and the second subscriber station 108b and the first user 108a and the second user 108b can communicate with each other directly.

Figure 8:
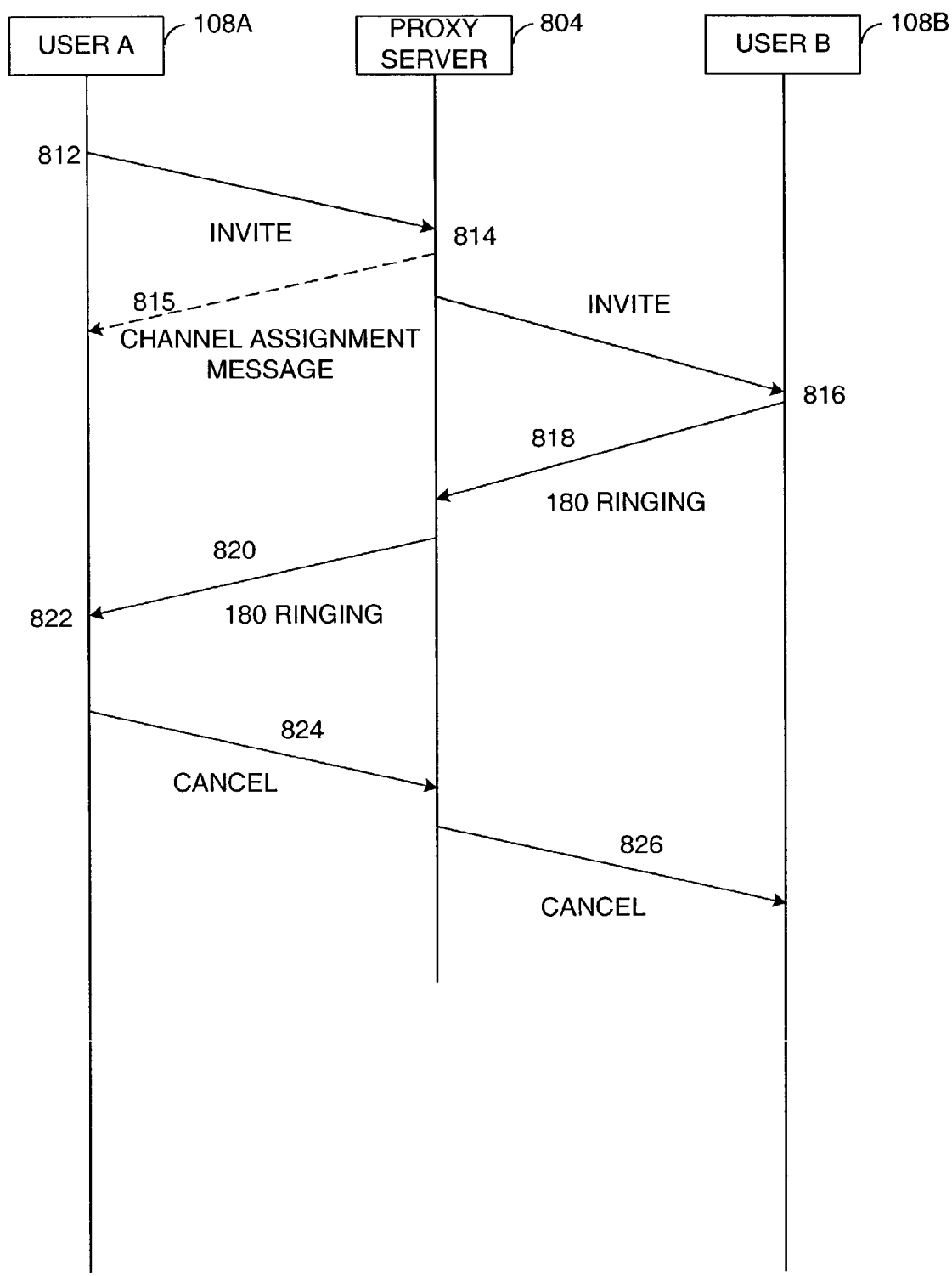
FIG. 8 shows a flow diagram of an exemplary embodiment of a SIP communications system, wherein the first user only wants to ring the second user and a call is terminated automatically.

FIG. 8 shows a flow diagram of an exemplary embodiment of a SIP communications system, wherein the first user only wants to ring the second user and a call is terminated automatically. In this embodiment, no changes to the air interface or to signaling messages are required in order to implement automatic termination of a call.

In step 812, the first user 108a originates a call (called an invite) that will ring the second user and will automatically be terminated upon the ringing of the second subscriber station 108b. The call includes details of the type of a media session that is requested by the first user. The types of media sessions that could be requested include, but are not limited to an audio session, a video session, and a multimedia session, for example. The call is originated by the first user 108a dialing the number of the second user 108b. The first user 108 indicates on the user interface of the first subscriber station 108a that the call will automatically be terminated upon the ringing of the second subscriber station 108b. Thus, a call message is created and sent to a proxy server 804, but the first subscriber station 108a has already identified the ongoing attempted call as a call that will automatically be terminated upon the ringing of the second subscriber station 108b. The identification of the ongoing attempted call as a call that will automatically be terminated occurs on the first subscriber station and is not indicated in the call message sent to the proxy server 804.

In step 814, the proxy server 804 receives the request for call origination, i.e., the call message. The proxy server 804 finds the second user in a register of users and sends a page to the second user. That is, the proxy server 804 sends a notification (also called an invite) to the second user that there is an incoming voice call for the second user. In step 815, the proxy server 704 allocates a first communication channel with its attendant resources to the first subscriber station 108a and allocates a second communication channel with its attendant resources to the second subscriber station 108b.

In step 816, the second subscriber station 108b receives the incoming call notification message and begins ringing. An enabled caller ID feature on the second subscriber station 108b enables the first user's identity to be displayed on the second subscriber station 108b. In an embodiment, the captured identity of the caller is displayed on a display of the second subscriber station. Alternatively, the captured identity of the caller is announced by a speaker on the second subscriber station.

In step 818, the second subscriber station 108b sends a ringing message to the proxy server 704. The ringing message indicates that the second subscriber station 108b is ringing. In step 820, once the proxy server 704 receives the ringing message from the second subscriber station 108b, the proxy server 704 sends a ringing message to the first subscriber station 108a. In step 822, a ringing tone is generated on the first subscriber station 108a upon the first subscriber station's receipt of the ringing message and therefore the first user hears the ringing tone. Commonly, this means for the first user that the second user's subscriber station is ringing.

In an embodiment, a ringing tone is generated on the first subscriber station 108*a* upon the first subscriber station's receipt of the ringing message and the first user hears the ringing tone in step 822. Commonly, this means for the first user that the second user's subscriber station is ringing. In another embodiment, a ringing tone is not generated on the first subscriber station 108*a* upon the first subscriber station's 108*a* receipt of the ringing message in step 822.

In step 824, a termination message (called a Cancel) is generated at the first subscriber station 108*a* and sent to the proxy server 804 without requiring any action by the first user 108*a*. Upon receipt of the termination message, the proxy server 904 de-allocates the first communication channel with its attendant resources to the first subscriber station 108*a* and de-allocates the second communication channel with its attendant resources to the second subscriber station 108*b*.

Then, in step 826, the proxy server 804 sends a corresponding termination message (also called a Cancel) to the second subscriber station 108*b* after the proxy server 804 receives the termination message from the first subscriber station 108*a*. Thus, the messages of steps 824 and 826 are triggered automatically. Upon receipt of the ringing message from the proxy server 804, the termination messages of steps 824 and 826 are triggered without the aid of the first user.

In step 828, the call attempt is terminated at the second subscriber station 108*b* and the second subscriber station 108*b* stops ringing when the termination message from the proxy server 804 is received. In an embodiment, a display on the second subscriber station 108*b* displays a message indicating a missed call from the first subscriber station 108*a*. In another embodiment, a message indicating a missed call from the first subscriber station 108*a* is announced by a speaker on the second subscriber station.

Figure 9:
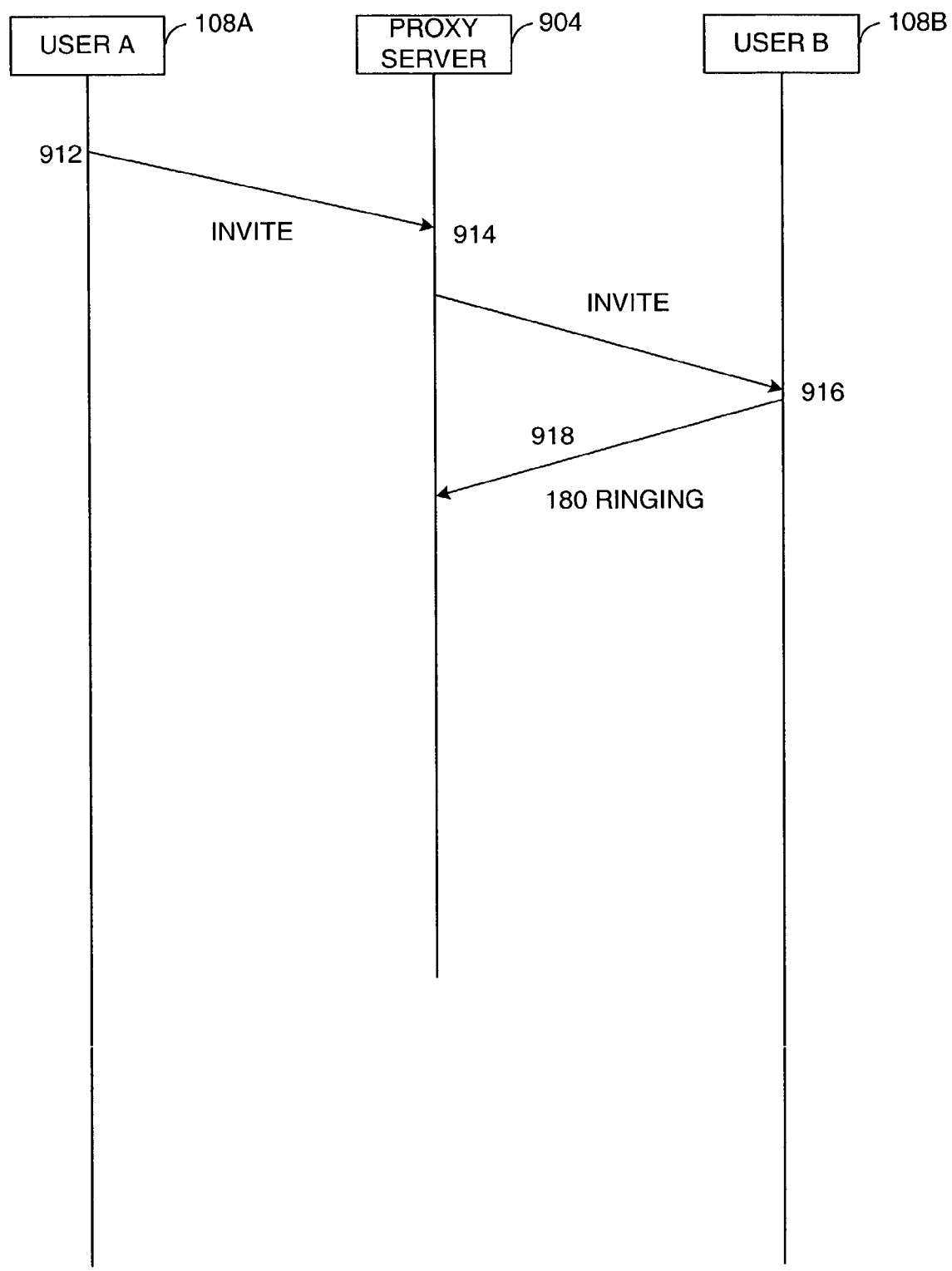
FIG. 9 shows a flow diagram of an exemplary embodiment of a SIP communications system, wherein an indication of automatic call termination is indicated in a message.

FIG. 9 shows a flow diagram of an exemplary embodiment of a SIP communications system, wherein the first user only wants to ring the second user and a call is terminated automatically.

In this embodiment, signaling messages are changed in order to implement automatic termination of a call. In step 912, the first user 108*a* originates a call (also called an invite) that will ring the second user and will automatically be terminated upon the ringing of the second subscriber station 108*b*. In step 912, when the first user determines that he only wants to ring the second user, a flag is set indicating that the first user is only ringing the second user. The flag can be encoded within the call message.

In at least one exemplary embodiment of the communications system, the first user indicates via a user interface on the first subscriber station 108*a* that a ring of the second user and not a call of the second user is to be performed. That is, the second user is to be rung and not called.

In at least one exemplary embodiment of the communications system, the first user indicates that the second user will be rung with a mechanism activated while dialing the number of the second user. In another exemplary embodiment of the communications system, the first user indicates that the second user will be rung with a mechanism separate from dialing the number of the second user. The mechanism distinguishes between the case wherein the first user wants to talk to the second user and the case wherein the first user wants only to ring the second user. In at least one exemplary embodiment of the communications system, the mechanism is at least one button to be depressed. In another exemplary embodiment, the mechanism is at least one key to be depressed. In another exemplary embodiment, the mechanism is at least one voice command to be issued in a voice enabled subscriber station. In at least one exemplary embodiment, the mechanism is implemented via a Web interface on the first subscriber station 108*a*. If the mechanism is enabled, a pending call will automatically be terminated.

In step 914, the proxy server 904 receives the call message. In an embodiment, the proxy server 904 receives an indication that the user only wants to ring the second user in the call message. In another embodiment, the proxy server 904 receives an indication that the user only wants to ring the second user in a message other than the call message. At this point, the proxy server 904 can determine from the indication (hereinafter called a ring-only indication) that there is no need to send a ringing message to the first subscriber station 108*a*. The proxy server 904 finds the second user in a register of users and sends a ring-only indication to the second user. That is, the proxy server 904 sends a call notification message (also called an invite) to the second user that the second user is to be rung only. There is no need to allocate communication channels with their attendant resources since the proxy server 904 knows that the second user is to be rung only.

In step 918, the second subscriber station 108*b* sends a confirmation message (also called a Page Response Message) to the proxy server 904. The confirmation message indicates that the second subscriber station 108*b* acknowledges the second subscriber station's 108*b* receipt of the incoming ring-only indication.

The network is not required to send a ringing message to the first subscriber station 108*a*, thereby saving bandwidth in a communication channel from the proxy server 904 to the first subscriber station 108*a*.

In an embodiment, the first subscriber station includes a call origination unit, a receive unit, and a terminating unit. The origination unit originates a call by sending a call message. The receive unit receives a response message to the call message. The terminating unit automatically terminates the call. Those of skill in the art would understand that these units could be combined without departing from the scope of the invention.

An alternative to the first subscriber station automatically terminating the call is an embodiment, wherein the second subscriber station automatically terminates the call responsive to an indication from the first subscriber station that the call is a ring-only call. Therefore, the second subscriber station includes a terminating unit for automatically terminating the call, in addition to including a receive unit that receives the indication that the call is a ring-only call.

FIG. 10 shows a flow diagram of an exemplary embodiment of a communications system, wherein an indication of automatic call termination is indicated in a message and a second subscriber station terminates a call.

In this embodiment, signaling messages are changed in order to implement automatic termination of a call. In step 1012, when the first user determines that he only wants to ring the second user, a flag is set indicating that the first user is only ringing the second user. The flag can be encoded within the call message.

In at least one exemplary embodiment of the communications system, the first user indicates via a user interface on the first subscriber station 108*a* that a ring of the second user and not a call of the second user is to be performed. That is, the second user is to be rung and not called.

In at least one exemplary embodiment of the communications system, the first user indicates that the second user will be rung with a mechanism activated while dialing the number of the second user. In another exemplary embodiment of the communications system, the first user indicates that the second user will be rung with a mechanism separate from dialing the number of the second user. The mechanism distinguishes between the case wherein the first user wants to talk to the second user and the case wherein the first user wants only to ring the second user. In at least one exemplary embodiment of the communications system, the mechanism is at least one button to be depressed. In another exemplary embodiment, the mechanism is at least one key to be depressed. In another exemplary embodiment, the mechanism is at least one voice command to be issued in a voice enabled subscriber station. In at least one exemplary embodiment, the mechanism is implemented via a Web interface on the first subscriber station 108*a*. If the mechanism is enabled, a pending call will automatically be terminated.

In step 1014, the network 104 receives the call message. In an embodiment, the network 104 receives an indication that the user only wants to ring the second user in the call message. In another embodiment, the network 104 receives an indication that the user only wants to ring the second user in a message other than the call message. At this point, the network 104 can determine from the indication (hereinafter called a ring-only indication) that there is no need to send a ringing message to the first subscriber station 108*a*. The network 104 finds the second user in a register of users and sends a ring-only indication to the second user. That is, the network 104 sends a notification to the second user that the second user is to be rung only.

In step 1016, the second subscriber station 108*b* receives the incoming ring-only indication and begins ringing. An enabled caller ID feature on the second subscriber station 108*b* enables the first user's identity to be displayed on the second subscriber station 108*b*. In an embodiment, the captured identity of the caller is displayed on a display of the second subscriber station. In another embodiment, the captured identity of the caller is announced by a speaker on the second subscriber station.

In step 1018, the second subscriber station 108*b* sends a terminating message to the network 104. The terminating message indicates that the second subscriber station 108*b* acknowledges the second subscriber station's 108*b* receipt of the incoming ring-only indication and that the network terminates the call.

In an embodiment, the network is not required to send a ringing message to the first subscriber station 108*a*, thereby saving bandwidth in a communication channel from the network 104 to the first subscriber station 108*a*. Alternatively, the network may send a ringing message to the first subscriber station 108*a*.

Those of skill in the art would also understand that a "ringing" of the second subscriber station does not have to be an aural ringing of the second subscriber station. Those of skill in the art would also understand that a "ringing" can be any indication on the second subscriber station that alerts the second user that an incoming call has been received. For example, a "ringing" can be a visual ringing, whereby text indicating ringing would be displayed on the display of the second subscriber station. Another example of a "ringing" can be a physical vibration of the second subscriber station indicating that the second user that an incoming call has been received.

Those of skill in the art would understand that method steps could be interchanged without departing from the scope of the invention. Those of skill in the art would also understand that information and signals might be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks and modules described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a subscriber station. In the alternative, the processor and the storage medium may reside as discrete components in a subscriber station.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method of communications, comprising:
   originating a call and indicating termination of the call wherein originating the call includes sending a call message, the call message including indicating termination of the call, wherein a determination to automatically terminate the call is made prior to the call origination; and
   terminating automatically the call responsive to the indicated termination of the call wherein terminating automatically occurs once the originating call is received.

2. The method of claim 1, further comprising receiving a response message to the call, wherein terminating automatically the call is responsive to the indicated termination of the call and the received response message.

3. The method of claim 2, wherein the received response message indicates ringing.

4. The method of claim 1, wherein the method of communications is a method of Session Initiation Protocol communications, originating a call includes sending an invite message, and terminating automatically the call responsive to the indicated termination of the call includes sending a cancel message.

5. A method of communications, comprising
sending a call message that initiates a call;
sending a call notification message responsive to the call message, the call notification message providing notification of the call;
sending a confirmation message responsive to the call notification message, the confirmation message confirming receipt of the call notification message;
sending automatically a termination message responsive to the confirmation message, wherein a determination to automatically send the termination message is made prior to the call initiation.

6. The method of claim 5, further comprising allocating a communication channel.

7. The method of claim 6, further comprising deallocating the communication channel responsive to receiving the termination message.

8. The method of claim 6, further comprising deallocating the communication channel responsive to receiving the confirmation message.

9. The method of claim 5, wherein allocating a communication channel includes sending a channel assignment message responsive to the call message, the channel assignment message assigning the communication channel.

10. A method of communications, comprising:
receiving a message that initiates a call with an indication to terminate the call; and
terminating the call responsive to receiving the message that initiates the call with an indication to terminate the call wherein the indication to terminate the call is automatically transmitted with the message that initiates the call, and further wherein a determination to automatically terminate the call is made prior to the call initiation.

11. A method of communications, comprising:
receiving a call message that initiates a call;
receiving an indication that the call is a ring-only call;
sending a call notification message responsive to the call message, the call notification message providing notification of the call; and
sending automatically a termination message responsive to the indication that the call is a rig-only call, the termination message terminating the call, wherein a determination to automatically terminate the call is made prior to the call initiation.

12. A subscriber station, comprising:
a call origination unit configured to originate a call and indicate termination of the call; and
a terminating unit configured to terminate the call automatically wherein the originated call is automatically terminated once the originated call is received and the originated call includes and indication to terminate the call, wherein a determination to automatically terminate the call is made prior to the call initiation.

13. The subscriber station of claim 12, wherein the terminating unit is configured to terminate the call automatically responsive to an indicated termination of the call.

14. The subscriber station of claim 12, wherein the terminating unit is configured to terminate the call automatically responsive to an indication of ringing.

15. The subscriber station of claim 12, further comprising a receive unit configured to receive a response message to the call.

16. The subscriber station of claim 15, wherein the subscriber station is configured to terminate the call automatically responsive to receiving a response message to the call.

17. A subscriber station, comprising:
means for originating a call;
means for indicating termination of the call; and
means for terminating the call automatically once the originated call is received by a subscriber station, wherein a determination to automatically terminate the call is made prior to the call initiation.

18. A subscriber station, comprising:
a receive unit that receives a message that initiates a call with an indication to terminate the call;
a terminating unit that automatically terminates the call responsive to receiving the message that initiates the call with an indication to terminate the call, wherein a determination to automatically terminate the call is made prior to the call initiation.

19. A subscriber station, comprising:
means for receiving a message that initiates a call with an indication to automatically terminate the call;
means for termination the call responsive to receiving the message that initiates the call with an indication to automatically terminate the call, wherein a determination to automatically terminate the call is made prior to the call initiation.

20. A network, comprising:
a receive unit configured to receive a call message that initiates a call and receive an indication that the call is a ring-only call; and
a send unit configured to send a call notification message responsive to the call message, the call notification message providing notification of the call, and configured to automatically send a termination message responsive to the indication that the call is a ring-only call, the termination message automatically terminating the call, wherein a determination to automatically send a termination message is made prior to the call initiation.

21. A communications system, comprising:
a first subscriber station configured to create and send a message that initiates a call and configured to create and send automatically a termination message responsive to a message indicating ringing, the termination message automatically terminating the call, wherein a determination to automatically terminate the call is made prior to the call initiation; and
a second subscriber station configured to ring upon receiving the message that initiates a call and configured to send a message indicating ringing and automatically terminating the call upon receiving the termination message.

* * * * *